Sept. 5, 1967  C. L. WELLONS  3,339,759
SILO UNLOADER

Filed Sept. 17, 1965  4 Sheets-Sheet 1

CHARLES LAUREN WELLONS
INVENTOR
BY
BUCKHORN, BLORE, KLARQUIST & SPARKMAN
ATTORNEYS

Sept. 5, 1967 C. L. WELLONS 3,339,759
SILO UNLOADER
Filed Sept. 17, 1965 4 Sheets-Sheet 2
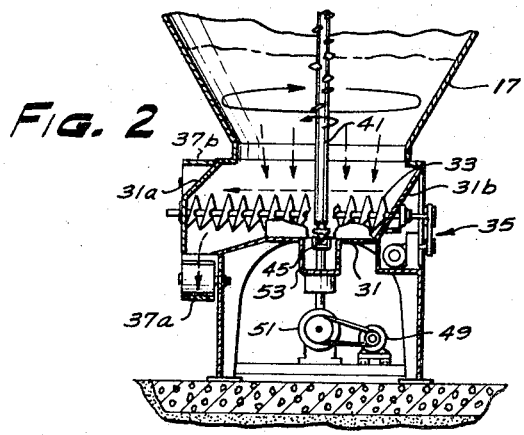
FIG. 2
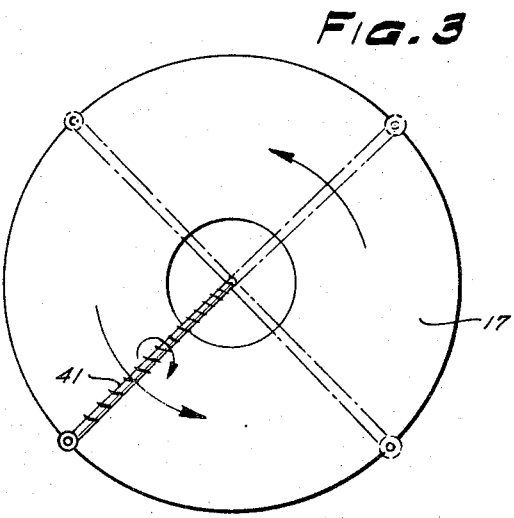
FIG. 3
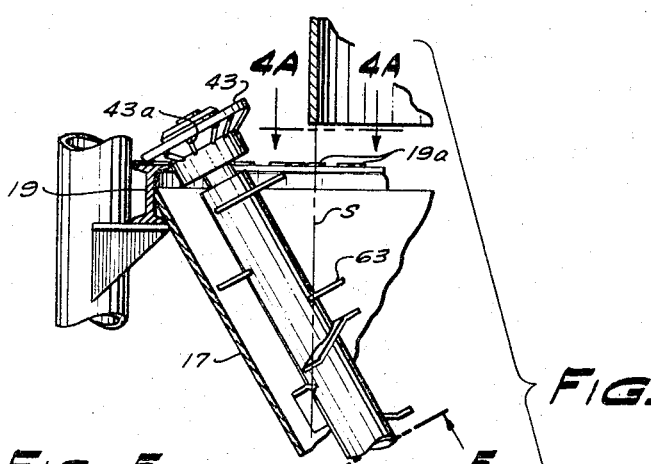
FIG. 4
FIG. 4A
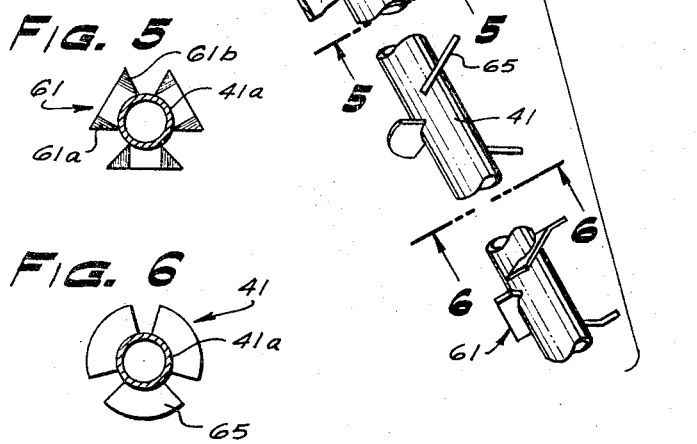
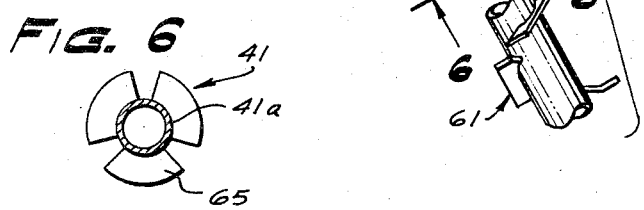
FIG. 5
FIG. 6
CHARLES LAUREN WELLONS
INVENTOR
BY
BUCKHORN, BLORE, KLARQUIST & SPARKMAN
ATTORNEYS

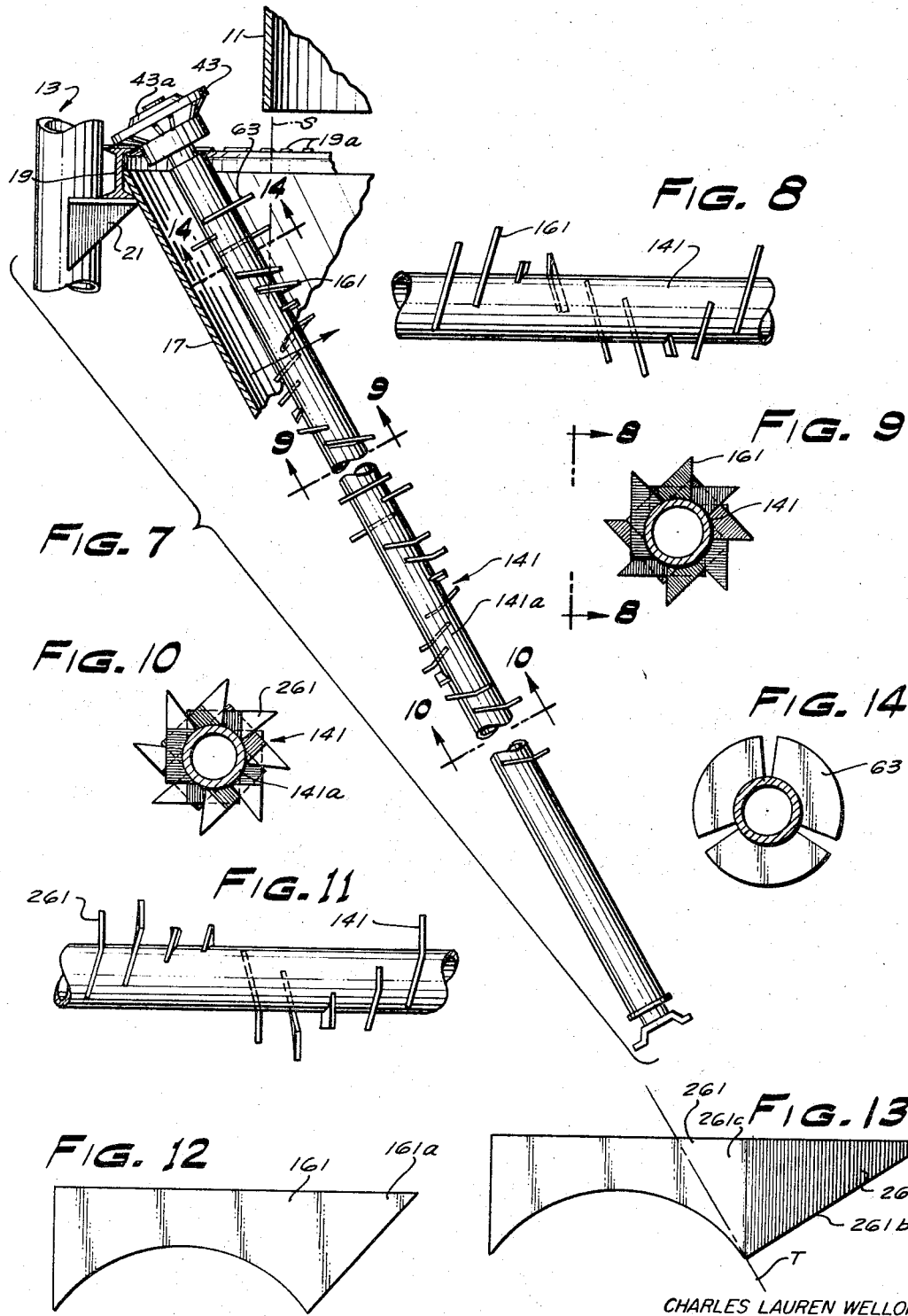

Sept. 5, 1967  C. L. WELLONS  3,339,759
SILO UNLOADER
Filed Sept. 17, 1965  4 Sheets-Sheet 4
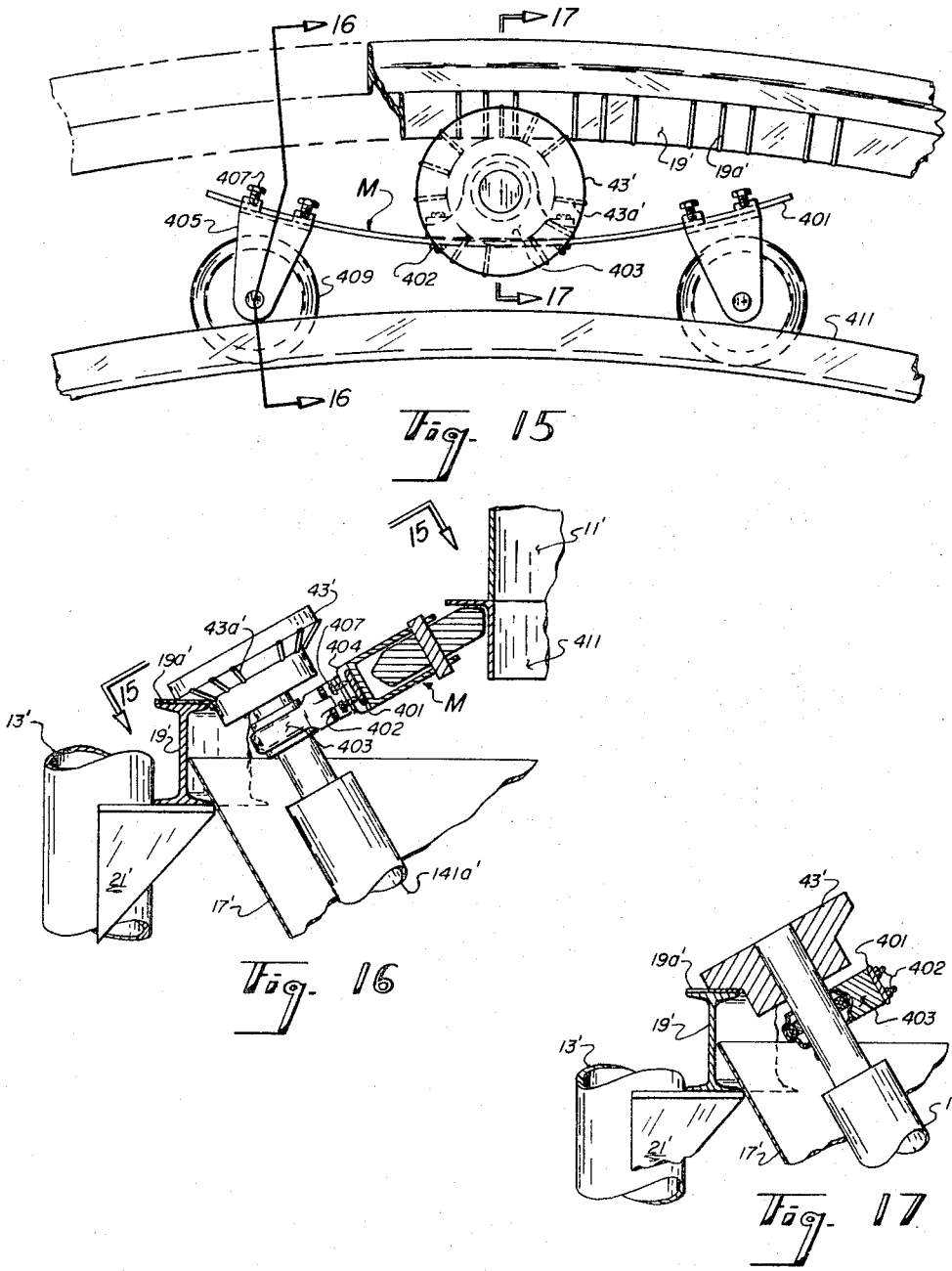
CHARLES LAUREN WELLONS
INVENTOR
BY
BUCKHORN, BLORE, KLARQUIST & SPARKMAN
ATTORNEYS

United States Patent Office 3,339,759
Patented Sept. 5, 1967

3,339,759
SILO UNLOADER
Charles L. Wellons, 4400 SW. Sunset Drive,
Lake Oswego, Oreg. 97034
Filed Sept. 17, 1965, Ser. No. 488,183
17 Claims. (Cl. 214—17)

This invention relates to silo unloaders, and particularly to silo unloaders of the type having an elongate agitator or feeder gyrating next to the inner face of the lower hopper portion of the silo. The invention will be explained in connection with a silo unloader for particled material such as sawdust, wood shavings and wood chips, but the invention can be used for handling other particled material.

In prior gyrating agitator silos of which I know, considerable difficulty has been experienced in preventing the particled material being handled from interfering with the drive to the agitator. This is particularly so when the particled material is wet and/or stringy. I have also noted that wet and/or stringy particled material tends to accumulate on the agitator to render it partially or wholly ineffective.

It is a main object of the present invention to provide in a silo of the above type features which overcome the above problems.

The agitator or feeder of my silo has a drive wheel at its upper end meshing with a drive ring, but both the drive wheel and the ring are located outwardly of the vertical load zone of the stack of particled material so that the ring and wheel operate in an environment which is relatively free of particled material. In addition, I provide randomly located drive teeth on the wheel and ring to make them self-cleaning. Furthermore, there are openings next to the drive ring to insure against trapping and accumulation of particled material on and around the drive ring. Also, I provide special type digger teeth on the agitator which tend to dig or bite into the particled material so as to aid in advancement of the agitator along its path of gyration. Furthermore, I provide support elements on the agitator which are segmental and axially staggered so as not to interfere with the operation of the agitator. These elements are normally slightly spaced from the inner face of the hopper portions of the silo, but engage such face when the elongate agitator deflects under heavy loads whereby to prevent permanent deflection of the agitator and also prevent engagement of the digger teeth with the wall of the hopper portion. In addition, I provide for the agitator a reversing arrangement which is operable under heavy loads within the silo to cause the agitator to reverse its direction of gyration to cause upward heaving of the particled material and thus relieve the overloaded agitator.

Various other objects of the invention will be apparent from the following description taken in connection with the accompanying drawings wherein:

FIG. 2 is a fragmental vertical section taken along line 2—2 of FIG. 1;

FIG. 3 is a diagrammatic plan view showing the gyrating movement of the agitator;

FIG. 4 is an enlarged fragment of FIG. 1 better showing certain parts;

FIG. 4A is a fragmentary plan view taken in the direction of the arrows 4A—4A of FIG. 4;

FIG. 5 is a sectional view taken along line 5—5 of FIG. 4;

FIG. 6 is a sectional view taken along line 6—6 of FIG. 4;

FIG. 7 is a view like FIG. 4 but showing a modified form of agitator;

FIG. 8 is an enlarged side view of a portion of the agitator in FIG. 7 showing one set of digger teeth of the type shown in FIG. 9;

FIG. 9 is a sectional view taken along line 9—9 of FIG. 7;

FIG. 10 is a sectional view taken along line 10—10 of FIG. 7;

FIG. 11 is an enlarged side view of a portion of the agitator in FIG. 7 showing a set of digger teeth of the type shown in FIG. 10;

FIG. 12 is an enlarged face view of a digger tooth of the FIG. 9 type;

FIG. 13 is an enlarged face view of a digger tooth of the FIG. 10 type;

FIG. 14 is a sectional view taken along line 14—14 of FIG. 7;

FIG. 15 is a fragmentary view taken in the direction of the arrows 15—15 of FIG. 16, showing a modified form of the invention;

Figure 1:
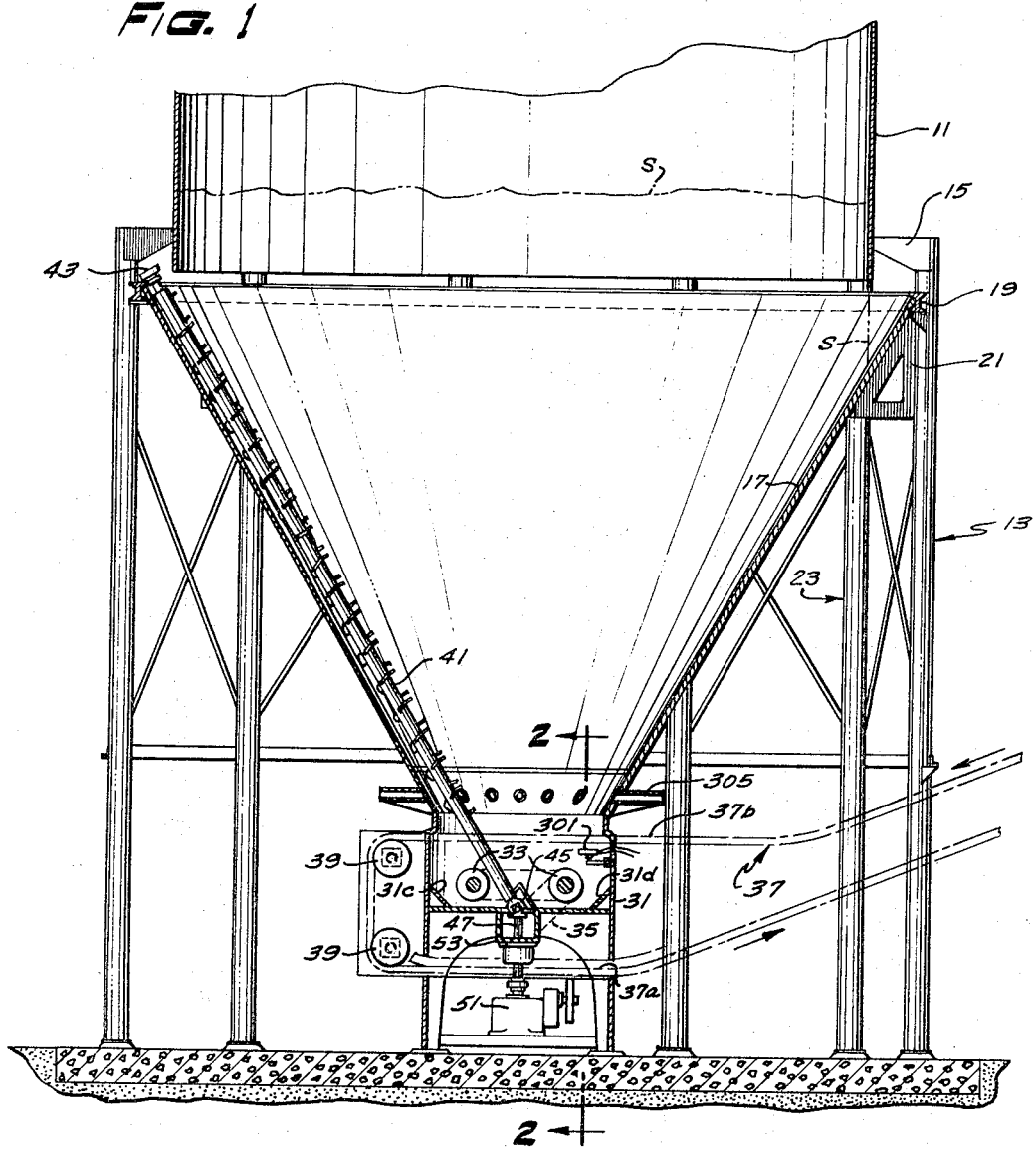
FIG. 1 is a vertical mid-section through a silo incorporating certain features of my invention.

FIG. 16 is a sectional view taken along line 16—16 of FIG. 15, the view being turned counterclockwise to a vertical position to better show the relationship of the parts in FIG. 16 to the parts in FIGS. 4 and 1; and FIG. 17 is a sectional view taken along line 17—17 of FIG. 15, the view being turned to a vertical position to conform to the showing in FIG. 16, the right-hand roller of FIG. 15 being left out of the background in FIGS. 16 and 17 for convenience in illustration.

The silo shown includes an upright cylindrical bin 11 supported at its lower end by a circularly arranged outer multiple post structure 13 whose diameter exceeds that of the bin. The bin is connected to the outer post structure by support elements 15 which span the annular space between the outer post structure and the lower end of the bin. A frusto-conical hopper 17 is supported in a coaxial position beneath the bin 11 by a ring 19, carried by the outer post structure and by gussets 21 mutually carried by the outer post structure 13 and by a circularly arranged inner multiple post structure 23. The diameter of the upper end of the hopper is greater than that of the bin so that such upper end extends outwardly beyond the confines of the bin and the hopper 17 is disposed in spaced relation beneath the bin 11.

Particled material in the hopper feeds downwardly into a discharge box 31 which is connected to the lower end of the hopper and which has a pair of parallel spaced horizontal augers 33 located on either side of the axis of the hopper. The augers are driven by a drive unit 35 in a direction to feed material toward the left hand end of the box 31, as the parts are shown in FIG. 2. At such end the particled material is deposited on the lower reach 37a of a conveyor belt 37. The upper reach 37b of the belt passes above the left hand corner 31a of the box 31, the belt being driven by a motor, not shown, and passing around pulleys 39 (FIG. 1), the latter being rotatably mounted on the discharge box 31.

Arranged within the hopper 17 is an agitator or feeder 41 having a drive wheel 43 at its upper end riding on the ring 19. The lower end of the feeder 41 is connected by a universal joint 45 to the upper end of a drive shaft 47, the latter being driven by a motor 49 (FIG. 2) through a speed reducer 51. The universal joint 45 is located within the upper end of a well 53 formed centrally in the floor of the discharge box 31.

It is evident from FIG. 2 that the upstream end 31b of the box 31 is inclined so that particled material is directed thereby toward the downstream end of the box. Further, the lower side portions of the box have baffle plates 31c and 31d (FIG. 1) to direct particled material toward the augers 33.

The ring 19 and the joint 45 support the feeder 41 so that it is generally parallel to the inner surface of the hopper 17 although preferably the feeder is supported so that it inclines outwardly toward the hopper 17 so as to form a downwardly diverging angle with the hopper.

The drive wheel 43 has a frusto-conical drive face (FIG. 7) provided with a plurality of randomly spaced radiating drive ribs 43a therearound which engage a plurality of randomly spaced drive ribs 19a (FIGS. 4 and 4A) located in radial fashion on the upper face of the drive ring 19.

The feeder 41 is equipped with plural longitudinally spaced sets of fixed rakes or digger teeth 61 (FIG. 4), there being three teeth to a set which teeth are equally circumferentially spaced about the feeder, as is evident from FIG. 5. These teeth are generally of trapezoidal form (FIG. 5), being concave at their inner edges to conform to the tubular body shaft 41a (FIG. 5) of the feeder. The teeth are progressively axially spaced therearound as is evident from FIG. 4 and function, when the feeder is rotated, to bite into the stack S of particled material which bears downwardly on and is supported by the hopper 17, whereby to agitate and loosen the same and feed the same downwardly into the discharge box 31. It is pointed out that the teeth 61 have angularly disposed end portions 61a and 61b which enable the teeth positively to bite into the pile or stack of particled material. The gyrating motion of the feeder unit 41 about the hopper is best shown in FIG. 3.

In addition to the digger teeth 61, the feeder 41 has several sets of plain support elements, two sets 63 and 65 being shown in FIG. 4. The upper support elements 63 are normal to the axis of the feeder 41 and are slightly spaced from the hopper 17, but may engage the hopper when the feeder unit 41 is heavily loaded to limit the deflection of the unit. This presents the digger teeth 61 from engaging the hopper, which action would damage the hopper and dull the teeth. The lower support elements 65 are oblique to the axis of the feeder 41 so as to aid in the downward feed of material in the hopper.

The drive ribs 43a and 19a are randomly located so that they have a self-cleaning action which prevents clogging of particled material between the ribs, particularly wet particled material such as sawdust or shavings.

The digger teeth arrangement in FIGS. 1-6 is satisfactory for dry shavings, barkdust, sawdust, etc., but cannot readily handle wet shavings. With the latter, the feeder 41 tends to bore a hole in such particled material and/or clog up and resist gyratory movement.

The arrangement in FIGS. 7-13, however, is suitable for handling wet wood shavings as well as dry particled wood and other material. It is basically like the FIG. 1 form of the invention in having a cylindrical bin 11 and a hopper 17 supported as previously described. It also has a feeder 141 driven in the same way feeder 41 is driven, but feeder 141 has different digger teeth differently arranged. I have found that I can get a superior digging action by providing digger teeth 161 (FIG. 9) which are arranged about the tubular body 141a of the feeder unit in circumferentially overlapping relationship, there being more teeth 161 (eight being shown) than teeth 61 so that the axial spacing between similarly oriented teeth is greater in FIG. 7 than in FIG. 1. This prevents clogging.

It is pointed out that teeth 161 are obliquely related to the axis of the feeder 141 so that as the feeder rotates in the direction of the solid arrow in FIG. 7, the digger teeth readily tear into the wet shavings pile or stack. Also the teeth 161 provide less support for the pile so that it will tend to bulge into the axial spaces between the similarly oriented teeth 161 facilitating engagement of the bulging portions by other teeth.

The teeth on the feeder 141 may all be plain as are teeth 161 or the teeth may be of angular rakish form as shown in the case of teeth 261 in FIGS. 10 and 11, or all the teeth may be like 261. Teeth 261 have a more intense tearing and digging action then teeth 161 and are very effective with stringy wet shavings and I believe will be I may additionally use curved blades bolted onto lugs on the feeder unit body so that the feeder unit can actually effective in handling bagasse, although in the latter case cut into the pile, in addition to or in lieu of the tearing and shredding action of the teeth 261.

The teeth 161 and 261 are generally of the same configuration as is evident from FIGS. 12 and 13, each having a squarish left end, as the parts are shown in such figures, and each having a pointed right end. However, the pointed portion 261a of the digger tooth 261 is sufficiently longer than the pointed portion 161a that the forward edge 261b of the tooth forms an included angle with the tangent line T which is less than 90° to give the tooth a forward rake or hook effect to better enable it to dig into the particled material being handled. Additionally, the digger tooth 261 has its pointed end 261a disposed at an angle to the body 261c of the tooth to give the tooth a second hook effect, when considered in a direction normal to the length of the feeder unit as is evident from FIG. 11.

Sometimes, the particled material being handled, particularly if it is wet, tends to pack down or be forced down, so tightly that it acts almost like a log. A safety switch mechanism 301 (FIG. 1) is provided on the interior of the discharge box 31 in a position to be subjected to the pressure of the particled material being fed or forced downwardly through the hopper 17. When the pressure on the switch mechanism reaches a predetermined value, the motor 49 is automatically reversed by a conventional circuit to drive the feeder unit in the reverse direction. Now, the oblique relation of the digger teeth to the feeder shaft causes an upward heaving movement of the packed particled material to thereby loosen and break up the same. The pressure now being relieved from safety switch mechanism 301, the motor is again reversed to once again urge the particled material downwardly.

In order to support the load of the particled material, when it is desired to remove or repair the augers 33 or universal joint 45, I provide a plurality of radially arranged horizontally disposed tubes 305. The tubes receive support rods (not shown) which can be thrust through the tubes and into the pile to temporarily support the same.

An important advantage of my invention is that the drive wheel 43 and the drive ring 19 are located outwardly of the stack of particled material as is evident from FIG. 4 whereby the drive is not interfered with by such material. I have discovered that the particled material has insufficient flowability to pass upwardly through the annular space between the upper end of the hopper 17 and the lower end of the bin 11, although from time to time some particled material will find its way to the drive ring and wheel. However, the randomly located ribs of the wheel and ring prevent such material from interfering with the drive between the ring and wheel. I do not want to rule out the possibility of employing gear teeth on the wheel and ring, but such provision would be considerably more expensive than the welded ribs construction shown and would have a tendency to clog up in the presence of certain types of particled material, particularly if it is wet.

I can locate the drive ring 19 and drive wheel 43 above the lower end of the bin 11 rather than as shown, to dispose it in a more out-of-the-way position. However, I prefer the ring in about the position shown because in such position, deflection of the shaft 41a of the feeder unit is less than would be the case if the shaft were longer.

An annular cover (not shown) may be provided over the annular space between the upper end of the hopper 17 and the lower end of the bin 11, but I prefer that the cover, if provided, not close off said space, whereby to prevent particled material from being packed around the drive ring 19 by allowing the same to be discharged over the upper end of said hopper.

FIGS. 15-17 show a modified form of the invention wherein the drive wheel 43' is pressed against the drive ring 19' by a biasing mechanism generally indicated by the reference letter M. This mechanism includes a leaf spring 401 secured by bolts 402 to a pillow block 403 in which the feeder agitator shaft 141a' is journaled.

Each end of the leaf spring 401 fits in slots provided by ear portions 404 of a wheel mount 405, the spring being secured in place by screws 407. Each wheel mount rotatably carries a wheel 409 which has a periphery of right angular cross section to fit against a backing ring 411 of right angular cross section, the latter being secured to the lower end of the bin 11'.

It is evident from FIG. 15 that the leaf spring 401 is deformed by the contact of the drive wheel 43' with the drive ring 19' and by the contact of the wheels 409 with the backing ring 411, whereby to positively bias the drive ring into engagement with the drive ring and hence prevent the wheel from being separated from such drive ring by the reactive force of the agitator feeder on the particled material therebeneath. If the drive wheel became separated from the drive ring, it would merely bore a hole in the particled material rather than gyrate around the silo. In handling some types of particled material under certain conditions, the biasing mechanism may not be necessary, but particularly with wet or stringy, or wet and stringy particled material, the mechanism will normally be necessary, at least during certain operative periods of the silo.

Having described the invention in what is considered to be the preferred embodiment thereof, it is desired that it be understood that the invention is not to be limited other than by the provisions of the following claims.

I claim:
1. In a silo for particled material,
a silo member including a hopper portion and an upright bin portion in concentric superposed relation to the hopper portion,
said hopper portion extending outwardly beyond the lower end of said bin portion in spaced relation thereto and defining an annular clearance space therewith,
an elongate agitator extending from the lower central portion of said hopper upwardly to a point which is outwardly of the lower end of said bin and into said clearance space,
and means for causing gyration of said agitator around said hopper portion.

2. In a silo for particled material,
a silo member including a frusto-conical hopper portion and an upright cylindrical bin portion in concentric superposed relation to the frusto-conical hopper portion,
said hopper portion extending outwardly beyond the lower end of said bin portion in spaced relation thereto and defining an annular clearance space therewith,
an elongate agitator extending from the lower central portion of said hopper upwardly to a point which is outwardly of the lower end of said bin and into said clearance space,
and means for causing gyration of said agitator around said hopper portion.

3. In a silo for particled material,
a silo member including a hopper portion and an upright bin portion in vertically aligned, superposed relation to the hopper portion,
said hopper portion extending outwardly beyond the lower end of said bin portion in spaced relation thereto and defining an annular clearance space therewith,
an elongate agitator extending from the lower central portion of said hopper upwardly to a point which is outwardly of the lower end of said bin and in said clearance space,
and means for causing gyration of said agitator around said hopper portion,
said means including a drive ring outwardly of the bin portion and in said clearance space and a drive wheel on the upper end of said agitator in driving engagement with said ring and positioned in said clearance space.

4. In a silo for particled material,
a silo member including a frusto-conical hopper portion and an upright cylindrical bin portion in superposed relation to the frusto-conical hopper portion,
said hopper portion extending outwardly beyond the entire periphery of the lower end of said bin portion in spaced relation thereto and defining therewith an annular clearance space,
an elongate agitator extending from the lower central portion of said hopper upwardly to a point which is outwardly of the lower end of said bin and in said clearance space,
and means for causing gyration of said agitator around said hopper portion,
said means including a drive ring outwardly of the bin portion and in said clearance space and a drive wheel on the upper end of said agitator in driving engagement with said ring and in said clearance space.

5. In a silo for particled material,
a silo member including a hopper portion and an upright bin portion in superposed relation to the hopper portion,
said hopper portion extending outwardly beyond the entire periphery of the lower end of said bin portion in spaced relation thereto,
an elongate agitator extending from the lower central portion of said hopper upwardly to a point which is outwardly of the lower end of said bin,
and means for causing gyration of said agitator around said hopper portion,
said means including a drive ring outwardly of the bin portion and a drive wheel on the upper end of said agitator in driving engagement with said ring,
said drive ring and wheel having randomly spaced drive teeth.

6. In a silo for particled material,
a silo member including an upright bin portion in superposed relation to a hopper portion,
said hopper portion extending outwardly beyond the entire periphery of the lower end of said bin portion in spaced relation thereto,
an elongate agitator extending from the lower central portion of said hopper upwardly to a point which is outwardly of the lower end of said bin,
and means for causing gyration of said agitator around said hopper portion,
said agitator including a shaft and plural sets of digger teeth on said shaft wherein the teeth are progressively staggered both axially and circumferentially of said shaft.

7. In a silo for particled material,
a silo member including an upright bin portion in superposed relation to a hopper portion,
said hopper portion extending outwardly beyond the entire periphery of the lower end of said bin portion in spaced relation thereto,
an elongate agitator extending from the lower central portion of said hopper upwardly to a point which is outwardly of the lower end of said bin,
and means for causing gyration of said agitator around said hopper portion,
said agitator including a shaft and plural sets of digger teeth on said shaft wherein the teeth are progressively staggered both axially and circumferentially of said shaft, said shaft having at least one set of support elements which are progressively staggered both axially and circumferentially about said shaft and which in the undeflected condition of said shaft are spaced from said hopper portion.

8. In a silo for particled material,
a silo member including an upright bin portion in superposed relation to a hopper portion,
said hopper portion extending outwardly beyond the entire periphery of the lower end of said bin portion in spaced relation thereto,
an elongate agitator extending from the lower central portion of said hopper upwardly to a point which is outwardly of the lower end of said bin,
and means for causing gyration of said agitator around said hopper portion,
said agitator including a shaft and plural sets of digger teeth on said shaft wherein the teeth are progressively staggered both axially and circumferentially of said shaft,
each tooth of at least one set having a planar midportion and planar end portions obliquely related to said midportion.

9. In a silo for particled material,
a silo member including an upright bin portion in superposed relation to a hopper portion,
said hopper portion extending outwardly beyond the entire periphery of the lower end of said bin portion in spaced relation thereto,
an elongate agitator extending from the lower central portion of said hopper upwardly to a point which is outwardly of the lower end of said bin,
and means for causing gyration of said agitator around said hopper portion,
said agitator including a shaft and plural sets of digger teeth on said shaft wherein the teeth are progressively staggered both axially and circumferentially of said shaft,
each tooth of at least one set having one square end and a pointed end and being obliquely related to the axis of said shaft.

10. In a silo for particled material,
a silo member including an upright bin portion in superposed relation to a hopper portion,
said hopper portion extending outwardly beyond the lower end of said bin portion in spaced relation thereto to define therewith an annular clearance space,
an elongate agitator extending from the lower central portion of said hopper upwardly to a point which is outwardly of the lower end of said bin and in said clearance space,
and means for causing gyration of said agitator around said hopper portion,
said agitator including a shaft and plural sets of digger teeth on said shaft wherein the teeth are progressively staggered both axially and circumferentially of said shaft,
the number of teeth to a set and the axial spacing of said teeth and the length of said teeth being such that (1) the axial distance between two adjacent teeth is less than the length of a tooth; (2) adjacent teeth overlap one another looking at said teeth from an axial direction; and (3) the axial distance between similarly located teeth is a multiple of the axial distance between alternate teeth.

11. In a silo for particled material,
a silo member including an upright bin portion in superposed relation to a hopper portion,
said hopper portion extending outwardly beyond the lower end of said bin portion in spaced relation thereto and defining therewith an annular clearance space,
an elongate agitator extending from the lower central portion of said hopper upwardly to a point which is outwardly of the lower end of said bin and in said clearance space,
and means for causing gyration of said agitator around said hopper portion,
said agitator including a shaft and plural sets of digger teeth on said shaft wherein the teeth are progressively staggered both axially and circumferentially of said shaft,
at least certain of said teeth having a forward rake.

12. In a silo for particled material,
a silo member including a hopper portion and an upright bin portion in superposed relation to the hopper portion,
said hopper portion extending outwardly beyond the lower end of said bin portion in spaced relation thereto to define an annular clearance space,
an elongate agitator extending from the lower central portion of said hopper upwardly to a point which is outwardly of the lower end of said bin,
and means for causing gyration of said agitator around said hopper portion,
said means including a drive ring outwardly of the bin portion and in said clearance space and a drive wheel on the upper end of said agitator in driving engagement with said ring and in said clearance space,
said clearance space providing for outward discharge of the minor portion of particled material that tends to accumulate on said drive and wheel.

13. In a silo for particled material,
a silo member including a hopper portion and an upright bin portion in superposed relation to the hopper portion and in vertical alignment with and positioned wholly inside the projected area of the hopper portion,
an elongate agitator extending from the lower central portion of said hopper upwardly therefrom,
and means for causing gyration of said agitator around said hopper portion,
said agitator including a shaft and plural sets of digger teeth on said shaft wherein the teeth are progressively staggered both axially and circumferentially of said shaft,
said shaft having at least one set of support elements which are progressively staggered both axially and circumferentially about said shaft and which in the undeflected condition of said shaft are spaced from said hopper portion.

14. In a silo for particled material,
a silo member including a hopper portion and an upright bin portion extending downwardly into and spaced laterally from the hopper portion,
an elongate agitator extending from the lower central portion of said hopper portion upwardly therefrom into the space between the hopper portion and the bin portion,
and means for causing gyration of said agitator around said hopper portion,
said agitator including a shaft and plural sets of digger teeth on said shaft wherein the teeth are progressively staggered both axially and circumferentially of said shaft,
said shaft having at least one set of support elements which are progressively staggered both axially and circumferentially about said shaft and which in the undeflected condition of said shaft are spaced from said hopper portion,
the number of teeth to a set and the axial spacing of said teeth and the length of said teeth being such that (1) the axial distance between two adjacent teeth is less than the length of a tooth; (2) adjacent teeth overlap one another looking at said teeth from an axial direction; and (3) the axial distance between similarly located teeth is a multiple of the axial distance between alternate teeth.

15. In a silo for particulated material, a frustoconical hopper positioned vertically with its larger end uppermost, an elongate agitator positioned in the hopper in a position extending along a side of the hopper, first drive means including universal joint means at the bottom of the hopper for rotating the agitator, second drive means including a fixed ring at the upper end of the hopper and a drive wheel keyed to the upper end of the agitator and drivingly engaging the fixed ring, whereby rotation of the agitator revolves the agitator around the hopper, and guide means in concentric superposed relation to said hopper for feeding a column of particulated material vertically downwardly, concentrically of the hopper and wholly inside the paths of the upper end portion of the agitator and the drive wheel.

16. The silo of claim 15 wherein the agitator includes a shaft and a plurality of digger teeth projecting outwardly from the shaft and spaced therealong.

17. The silo of claim 16 wherein the first drive means is reversible and the teeth have digger portions.

References Cited
UNITED STATES PATENTS

| | | | |
|---|---|---|---|
| 2,309,418 | 1/1943 | Schweickart et al. | 198—213 |
| 3,067,914 | 12/1962 | Ellaby | 214—17 X |
| 3,127,032 | 3/1964 | Roberts | 214—17 |
| 3,155,542 | 11/1964 | Cordell et al. | 214—17 X |

FOREIGN PATENTS

| | | |
|---|---|---|
| 1,085,404 | 7/1960 | Germany. |

GERALD M. FORLENZA, *Primary Examiner.*

ROBERT G. SHERIDAN, *Examiner.*

UNITED STATES PATENT OFFICE
CERTIFICATE OF CORRECTION

Patent No. 3,339,759                 September 5, 1967

Charles L. Wellons

It is hereby certified that error appears in the above numbered patent requiring correction and that the said Letters Patent should read as corrected below.

Column 3, line 35, for "presents" read -- prevents --; line 75, for "then" read -- than --; column 4, line 4, strike out "effective in handling bagasse, although in the latter case" and insert the same after "will be" in line 1, same column 4; column 6, lines 47 and 62, and column 7, lines 7, 25, 43 and 68, after "including", each occurrence, insert -- a hopper portion and --; column 6, lines 48 and 63, and column 7, lines 8, 26, 44 and 69, for "a", each occurrence, read -- the --; column 8, line 16, after "define" insert -- therewith --.

(SEAL)      Signed and sealed this 24th day of September 1968.

Attest:

Edward M. Fletcher, Jr.                 EDWARD J. BRENNER

Attesting Officer                       Commissioner of Patents